Nov. 1, 1955  S. FAULKNER  2,722,505
METHOD OF AND APPARATUS FOR DEODORIZING OILS
Filed July 27, 1950  2 Sheets-Sheet 1
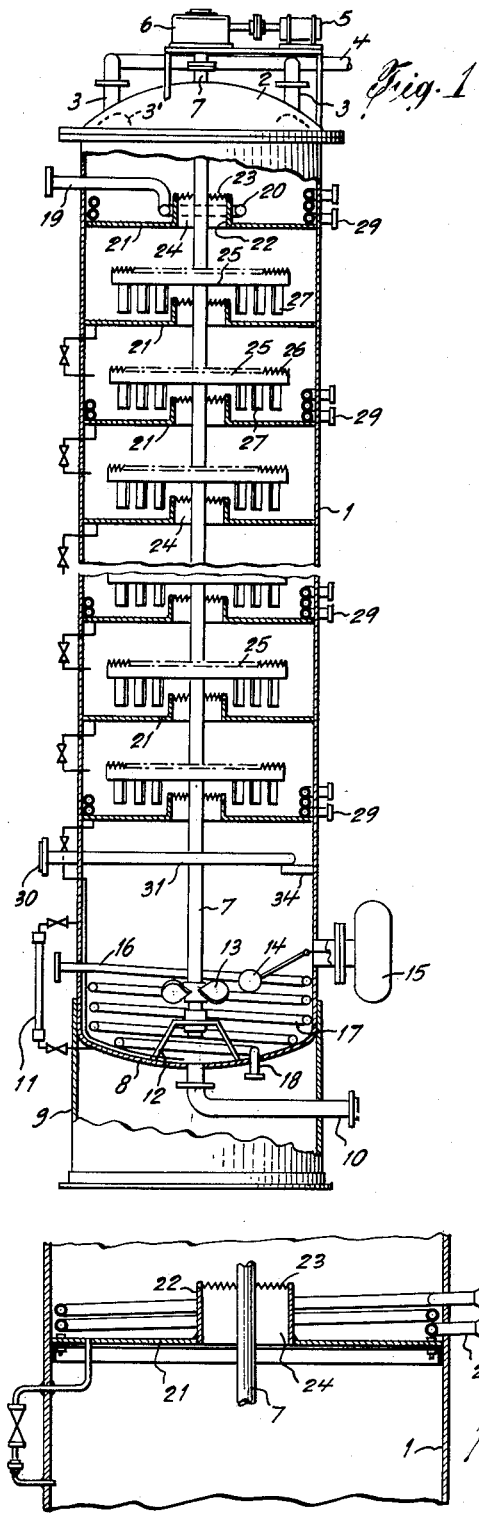
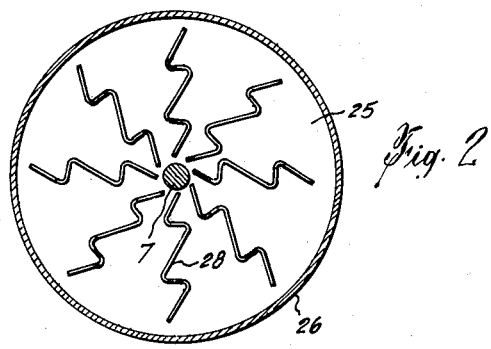
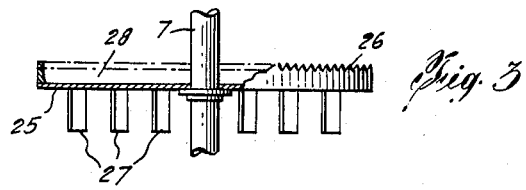
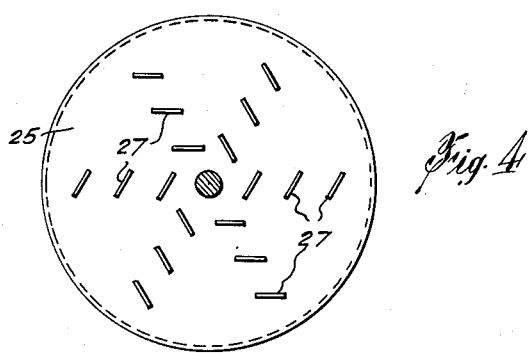
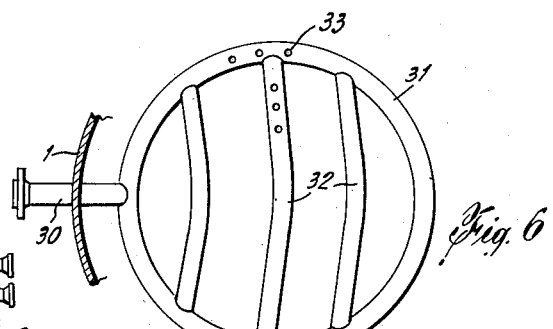
INVENTOR.
SEYMOUR FAULKNER
BY
ATTORNEY

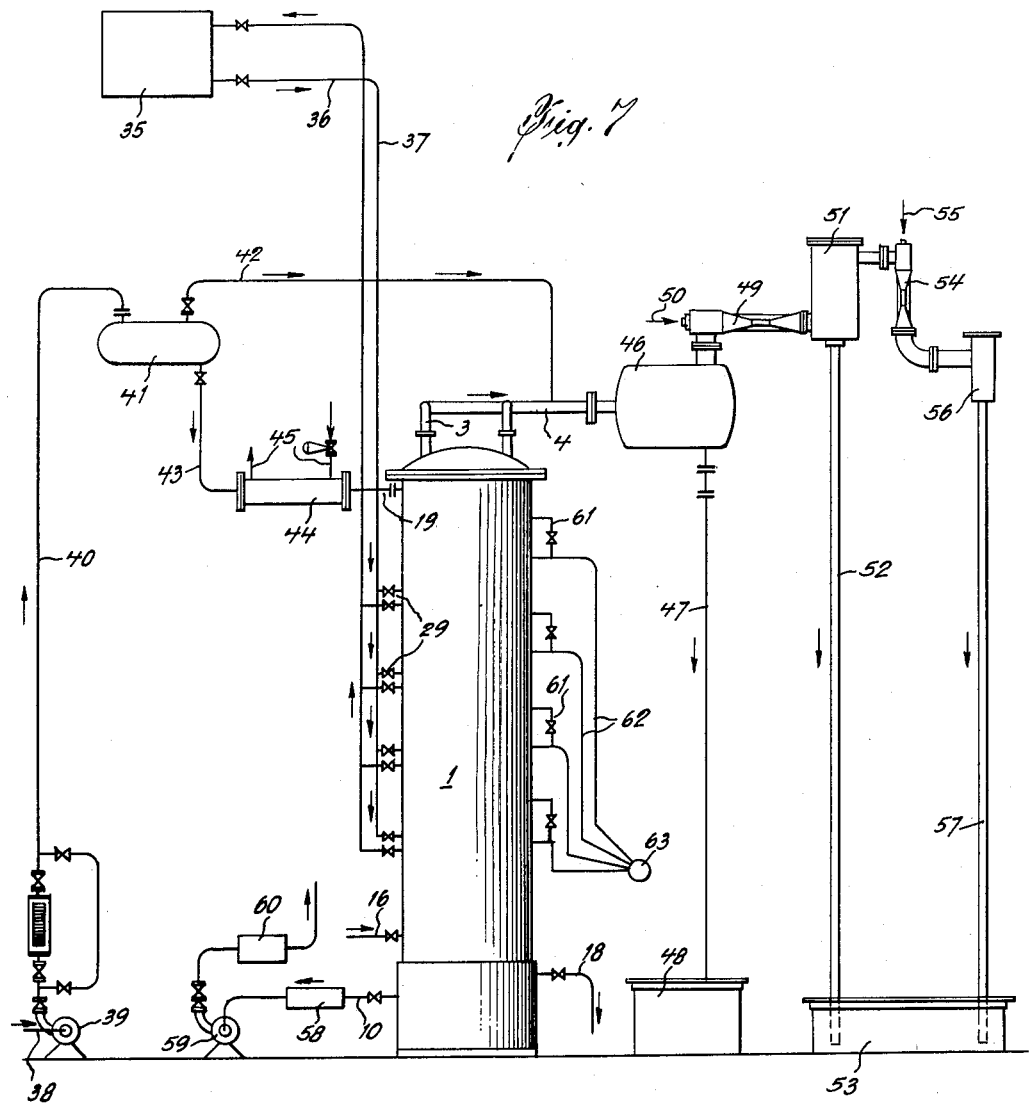

United States Patent Office 2,722,505
Patented Nov. 1, 1955

2,722,505

METHOD OF AND APPARATUS FOR DEODORIZING OILS

Seymour Faulkner, Summit, N. J.

Application July 27, 1950, Serial No. 176,210

7 Claims. (Cl. 202—46)

The present invention is directed to the treatment of glyceride oils, particularly for edible purposes and is directed more particularly to the deodorization of such oils to remove undesirable volatile substances therefrom.

It has been customary in the field to refine crude vegetable or animal oils or fats by treating the same with caustic soda or the like to remove undesirable impurities. It is also customary in cases where shortening or higher melting point products are desired, to hydrogenate the oils and fats. After such treatments there still remain small amounts of volatile and highly odoriferous matter having undesirable odors either originally present or formed during the hydrogenation, and it has been customary to remove the same by a deodorization process. Such deodorization was usually accomplished by heating a body of oil having a depth of several feet and bubbling steam through the hot oil under a relatively high vacuum, but the vacuum several feet below the oil surface was negligible. This was a slow and costly procedure requiring large volumes of steam and water and the results were rather unsatisfactory.

In an improvement on this process, the deodorization chamber was a column having a series of plates vertically spaced and containing a body of oil usually two or more inches deep. Steam was introduced at the bottom of the column and bubbled through the successive plates under a relatively high vacuum at the top. This required the provision of various accessory equipment, including a catch-all tank, through which the steam passed from the column, and there was also provided a multi-stage ejector and two barometric condensers for producing the vacuum. While substantial amounts of steam were necessary in this process, less steam was required in general than in the batch process. However, both types of processes described depend upon steam to agitate the oil mass as well as remove odoriferous volatile materials therefrom. The use of open blowing and ejector steam for agitation is far more costly than by mechanical means, using electric power.

The deodorization in the continuous column was not complete and one of the reasons was that the vacuum in the column decreased substantially from the top to the bottom of the column due to the progressive build-up of pressure from plate to plate to overcome the liquid depths of oil on the plates. The lowest vacuum prevailed in the bottom sections of the columns where actually the highest vacuum should prevail in order to remove the last traces of impurities.

The present invention is intended and adapted to overcome the difficulties and disadvantages inherent in prior methods of the type described, it being among the objects of the present invention to provide a method of deodorization of glyceride oils and an apparatus for accomplishing the purpose which is substantially more economical and efficient in operation than prior methods and apparatus.

It is also among the objects of the present invention to provide a method in which the amount of steam necessary for substantially complete deodorization is greatly reduced and in which the entrainment of oil in the effluent steam is minimized.

It is further among the objects of the present invention to provide a high degree of deodorization with smaller and less expensive equipment, while maintaining a high vacuum throughout the system.

In practicing the present invention, there is provided a column having a series of vertically placed plates or receptacles with provision for oil being introduced at or near the top and to travel downwardly from receptacle to receptacle. A high vacuum is maintained in the column by usual methods and steam is passed upwardly through the column into contact with the oil but without passing through any substantial depth of oil. The steam passes through and across the surface of the oil which is agitated, and it also passes across falling droplets of oil. Thereby practically no back pressure is built up and the high vacuum is fully maintained from top to bottom of the column.

Interposed between the receptacles are distributor trays which are rotated and which contain oil being treated. The oil passes alternately from receptacle to distributor tray to receptacle and so through the column. The trays have depending blades which dip into the oil in the receptacles and vigorously agitate the same. Within the trays are baffles usually sinuous in shape which during the rotation thereof agitate the oil and throw upwardly particles of oil while the steam passes across the surface. Both the receptacles and the trays are preferably provided with serrated edges so that as oil passes over such edges, it is divided into fine streams, exposing a large surface to the steam.

In the accompanying drawing constituting a part hereof, and in which like reference characters indicate like parts, Fig. 1 is a vertical cross-sectional view of a column made in accordance with the present invention, some parts being shown diagrammatically for clearness;

Fig. 2 is a horizontal cross-sectional view taken through the column and showing the internal structure of a distributor tray or rotating plate;

Fig. 3 is a side evelational view thereof, some parts being broken away for clearness;

Fig. 4 is a view from below of one of the distributor trays;

Fig. 5 is a fragmentary enlarged vertical cross-sectional view of one of the receptacles;

Fig. 6 is a bottom plan view of the steam distribution element, and

Fig. 7 is a diagrammatic view of a system embodying the invention.

The column consists usually of a vertical cylindrical metal shell 1 having a flanged dome-shaped cover 2 with a pair of vapor exit pipes 3 connecting with outlet pipe 4. Internal baffles 3' adjacent pipes 3 remove entrained oil from the vapors. A motor 5 mounted on cover 2 operates through gearing 6 to rotate vertical shaft 7.

The bottom 8 of the column rests on base or support 9 and a pipe 10 gives access to the bottom of the column for removal of deodorized oil. A sight gauge 11 is provided to determine the amount of oil in the bottom of the column. The lower end of shaft 7 is mounted at 12 in a suitable bearing and carries an impellor 13 to agitate and assist in cooling the deodorized oil. A float 14 is connected to suitable mechanism 15 whereby a predetermined level of oil may be maintained in the column. A pipe 16 is connected to cooling coil 17 having an outlet 18 whereby cooling fluid may be circulated in the bottom of the column.

An oil inlet 19 at the top of the column connects to horizontal ring 20 having a series of openings therein to permit oil to flow onto receptacle 21, which may be considered a distributor plate. An upstanding annulus 22 has a serrated upper edge 23 providing an internal space 24. Oil from distributor plate 21 flows over edges 23 and into the next section, onto distributor plate 25.

Just below plate 21 is a distributor tray or rotating plate 25 having an upstanding flange with serrated edges 26. Said tray is substantially wider than opening 24. Depending from the under side of tray 25 are a series of blades 27 which are of sufficient length to dip into the oil in receptacles 21. Within the tray are a series of baffles 28, as more particularly shown in Fig. 2, being sinuous in form.

A series of such units consisting of receptacle and tray are provided in vertical alinement through a major portion of the length of the column. There is usually provided a series of coils 29 on alternate or on each of the compartments so formed, for the introduction of steam or other heating fluid in order to maintain the desired temperature of the oil at the proper point for optimum deodorization.

Below the lowest unit is a pipe 30 for the entrance of the blowing steam connected to ring 31 having cross pipes 32 with openings 33 at the upper side of the steam distributing unit. The edge of ring 31 opposite pipe 30 rests on ledge 34 to provide a fully supported arrangement.

As shown in Fig. 7, coils 29 are connected to a heating furnace 35 of suitable type through circulating pipes 36 and 37. Oil to be deodorized enters the system through pipe 38 and is forced by pump 39 through pipe 40 into deaerator 41, vapors therefrom passing out into pipe 42. The oil flows through pipe 43 through superheater 44 having inlet and outlet pipes 45 for heating fluid.

The preheated oil flows through pipe 19 into upper distributing plate 21 of column 1 with sufficient heat being supplied through coils 29 to maintain the desired temperature. Motor 5 is energized, causing rotation of shaft 7. Steam is introduced through pipe 30 at a relatively high vacuum and passes upwardly through the lowest opening 24, then horizontally across blades 27, then upwardly and inwardly over the surface of the oil in tray 25. Since oil is dropping in fine streams from serrated edges 26, the steam passes across the path of such droplets. Then the steam passes upwardly through the next opening 24 across the path of a stream of droplets falling over serrated edges 23 and the cycle is repeated by the steam passing through the several superposed units.

Vapors flowing in exit pipe 4 enter the hot catchall 46 where neutral oil, free fatty acid and upsaponifiable matter are deposited flowing through pipe 47 into hot catchall tank 48. Ejector 49 actuated by steam 50 creates a vacuum in the system and draws the vapors into barometric condenser 51 cooled by water which flows down through pipe 52 into hot well 53. A second ejector 54, usually of lesser size and capacity, actuated by steam 55 draws the vapors into a second barometric condenser 56 cooled by water which flows into hot well 53 through pipe 57, and finally a steam air ejector exhausts any residual uncondensibles to the atmosphere.

The treated, deodorized oil flows into the bottom of column 1 where it is cooled to a moderate temperature by cooling coils 17. It then flows down through exit pipe 19 through oil cooler 58, from which it is forced by pump 59 through final cooler 60. Said coolers may be maintained at the desired temperatures by suitable arrangements. In order to remove oil which may be held in the various sections, the valves of drain pipes 61 are opened so that the oil on plates 21 drains to the bottom of the column. At the same time motor 5 is speeded up, throwing off of the trays by centrifugal force any oil which remains thereon. Or, the oil may be caused to flow through pipes 62 into receiver pipe 63.

Conditions may be adjusted so as to give excellent deodorization in a relatively short time with great economy in steam and water. The flow is continuous and the steam does not pass through any appreciable depth of oil. The vacuum may be about 5 mm. and throughout the column the decrease in vacuum is usually no over 1 mm. so that the maximum pressure is not more than 6 to 7 mm. On the other hand, in prior methods, there was a pressure drop of 1 to 1½ mm. in each plate so that the maximum pressure in the column was up to, say, 23 mm. in a 10 to 12 plate column, which greatly decreased the effectiveness of deodorization. Most of the deodorization is accomplished by the agitation of the oil and fine subdivision thereof, exposing to the steam large surfaces. In the prior methods the steam was relied upon to do all of the work, whereas in the present invention much of the steam is eliminated and mechanical agitation is substituted with greater economy, better efficiency and lesser time of treatment.

In the operation of the present process the temperatures in the column are maintained from about 350° to 500° F. For unhardened oils temperatures of 350° to 420° F. are ordinarily used, and for hardened oils preferably 400° to 500° F. are employed. The amount of steam used in the column is usually from 1% to 4% of the weight of the oil, depending upon the kind of oil and character of impurities to be removed. The time of contact between steam and oil is usually from ½ to 4 hours. Therefore, the amount of steam used in the present process is from ½ to ¼ of the steam necessary in prior methods. Also because of the smaller volume of steam used in the present invention, the size of the barometric condensers may be greatly reduced and the amount of steam necessary for maintaining the vacuum therein has become a fraction of that necessary in the old process.

As a specific example of the present invention, one may provide a column having 12 chambers or sections in a diameter of 5 ft. and a height of about 30 ft. with a flow of oil of 3500 lbs. per hour for 10 hours. The oil used is a hardened cottonseed oil; the temperature in the column is 400° to 480° F. with a contact time of 2 to 3 hours. The amount of open blowing steam used in the operation is 100 to 140 lbs. per hour. In the ejectors for the barometric condensers, there is used during the entire operation, including the first stage of heating up, the second or blowing stage, and the third or cooling stage, a total of from 1000 to 1400 lbs. of steam per hour. This compares with at least 2800 lbs. per hour of steam in the ejectors in the old process, and blowing steam of 650 lbs. per hour for 4 hours, and 325 lbs. per hour for an additional 2–3 hours, in the heating up and the cooling down periods.

I claim:

1. Apparatus for deodorization of liquid fatty materials comprising a closed vertical column, means for introducing hot gas into the lower portion thereof, means for removing gaseous substances in the upper portion thereof, at least one horizontal tray in said column for holding liquid, a vertical shaft centrally in said column to which said tray is attached and means for rotating said shaft and tray, a plurality of sets of concentrically arranged blades depending from the underside of said tray, a fixed receptacle below said tray into which all of said sets of blades extend to a point below the level of liquid therein, said receptacle having a central opening to permit said gas to pass upwardly therethrough and radially across the surface of said receptacle, heating means in said receptacle for said liquid, the diameter of said tray being substantially greater than that of said opening and said blades being within the periphery of said tray, means on said periphery for causing liquid to spill over in a plurality of streams, sinuous baffles in said tray having portions at angles to the radius extending from said shaft to cause agitation of liquid in said tray, and means for feeding said liquid at the top of said column.

2. Apparatus according to claim 1 in which the peripheral edges of said tray are serrated.

3. Apparatus according to claim 1 in which the peripheral edges of said tray and of said opening are serrated.

4. Apparatus according to claim 1 in which said blades are flat and at an angle to the direction of rotation of said tray.

5. A process for deodorization of glyceride oils and fats which comprises flowing said material downwardly through an enclosed space under a vacuum and at a sufficiently high temperature to vaporize odoriferous constituents therein, said flow being through a plurality of superposed zones, said material in each zone being caught in a shallow layer and rotated, interfering with the flow in said layer to cause agitation of said material, spilling said material in a plurality of streams over the outer edge of said layer, then catching said streams in a pool of said material, agitating said pool, causing said pool to overflow in a plurality of streams over the inner edge thereof and into the next lower zone, and passing hot gas upwardly through the streams flowing from said pool, then over said pool and through the streams flowing from said layer, and then over said layer, and heating the material in said pool.

6. A process according to claim 5 in which the flow of hot gas is alternately in vertical and horizontal directions.

7. A process according to claim 5 in which the flow of hot gas is horizontal over said layer and pool and through said streams.

References Cited in the file of this patent

UNITED STATES PATENTS

| | | |
|---|---|---|
| 679,587 | Zellweger | July 30, 1901 |
| 1,095,835 | Fiddes | May 5, 1914 |
| 2,368,669 | Lee et al. | Feb. 6, 1945 |
| 2,461,694 | McCubbin | Feb. 15, 1949 |
| 2,480,215 | Bowden et al. | Aug. 30, 1949 |
| 2,561,669 | Macq | July 24, 1951 |
| 2,672,330 | Swenson | Mar. 16, 1954 |
| 2,691,665 | Bailey | Oct. 12, 1954 |

FOREIGN PATENTS

| | | |
|---|---|---|
| 27,072 | Great Britain | of 1911 |